United States Patent [19]

Shaw

[11] Patent Number: 4,771,972
[45] Date of Patent: Sep. 20, 1988

[54] BRACKET FOR SELF-SECUREMENT TO A STRUCTURAL SUPPORT MEMBER

[76] Inventor: Franklin J. Shaw, 18972 Raymond Rd., Addison, Mich. 48220

[21] Appl. No.: 147,232

[22] Filed: Jan. 22, 1988

[51] Int. Cl.[4] .............................................. E04G 3/14
[52] U.S. Cl. .............................. 248/217.2; 248/218.4; 248/240.4; 182/92
[58] Field of Search ................ 248/546, 216.1, 216.4, 248/217.1, 217.2, 218.4, 219.3, 225.31, 235, 240.4; 182/92; 108/152; 52/DIG. 6

[56] References Cited

U.S. PATENT DOCUMENTS

| 758,200 | 4/1904 | Bennett | 248/217.1 |
| 1,098,945 | 6/1914 | Frederick | 248/217.1 |
| 1,275,392 | 8/1918 | Collins . | |
| 1,409,800 | 3/1922 | Turner . | |
| 2,201,138 | 5/1940 | Hyde . | |
| 2,699,312 | 1/1955 | Cesare | 248/235 |
| 2,854,293 | 9/1958 | Riblet | 248/218.4 |
| 3,070,337 | 12/1962 | Gates | 248/235 |
| 3,158,348 | 11/1964 | Rutter | 248/217.2 |
| 4,039,064 | 8/1977 | Kirby | 248/225.31 |
| 4,368,800 | 1/1983 | Campbell | 248/235 |
| 4,452,336 | 6/1984 | Sickler . | |

FOREIGN PATENT DOCUMENTS

174291  1/1935  Switzerland ............. 248/217.1

Primary Examiner—J. Franklin Foss
Assistant Examiner—Robert A. Olson
Attorney, Agent, or Firm—Shefte, Pinckney & Sawyer

[57] ABSTRACT

A bracket adapted for self-securement to a building stud or like structural support member having a base on which a bracket member is pivotably mounted for actuating a pair of spaced operating rods, each with a sharpened barb, to move laterally inwardly and outwardly toward one another for selective penetrating engagement and disengagement of the bracket on the stud, thereby enabling easy mounting and demounting without tools.

8 Claims, 4 Drawing Sheets

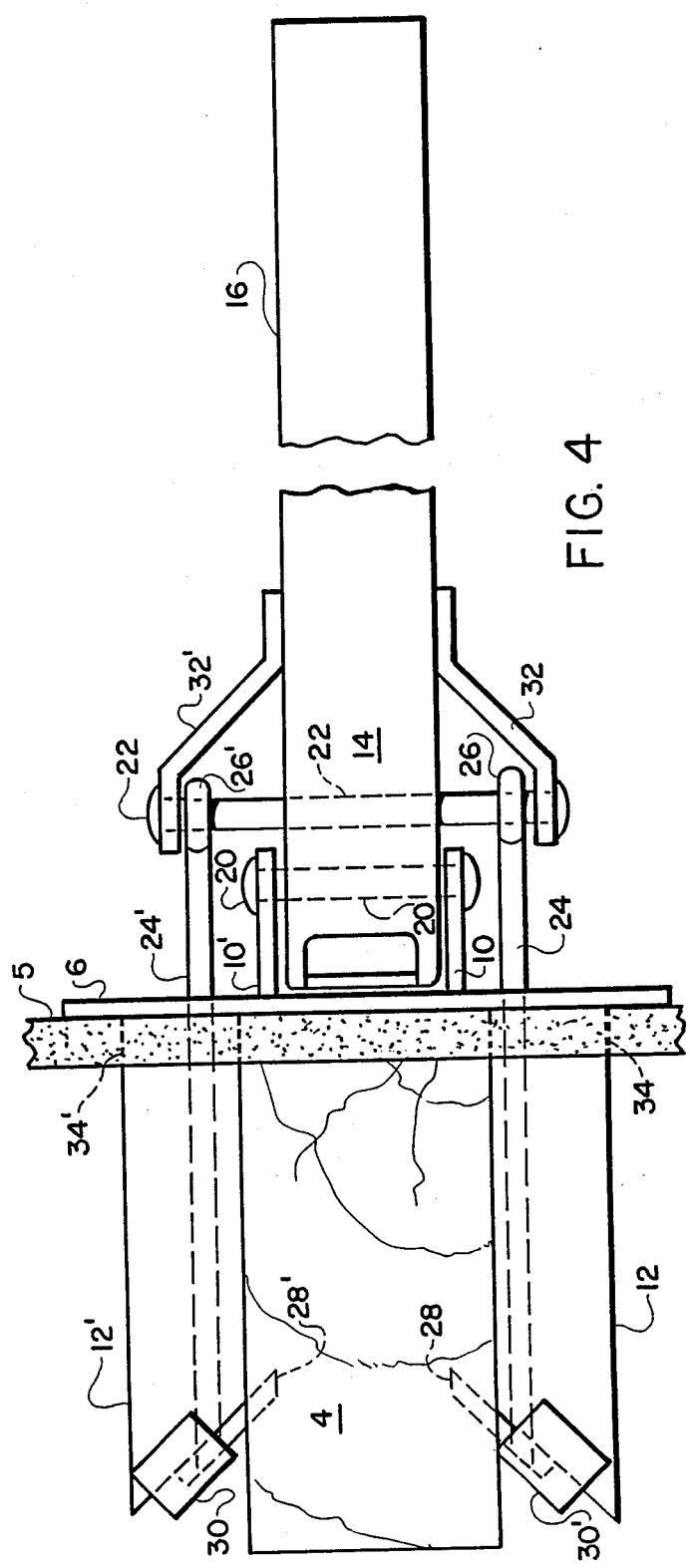

BRACKET FOR SELF-SECUREMENT TO A STRUCTURAL SUPPORT MEMBER

BACKGROUND OF THE INVENTION

The present invention relates to support brackets, such as shelf brackets or the like, and more particularly to a bracket adapted for self-securement to a structural support member or the like.

Various forms of self-securing brackets such as those disclosed by U.S. Pat. Nos. 4,452,336; 2,201,138; 1,409,800; and 1,275,392 serve various and sundry support type functions. Such brackets find particular application in mounting counters, shelving or other support platforms to the structural support members of a building or similar structures.

The 2×4 wooden stud is perhaps the most common structural support member for homes and other dwellings and small buildings, as well as the interior walls of larger buildings. In order to have a strong secure mounting, the bracket for mounting a counter, shelf, or other cantilevered platform is usually secured to one or more studs and, if a substantial amount of weight is to be supported, multiple brackets may be required. Mounting a shelf or counter in this respect can become a time consuming and laborious task. Additionally, if the structure's walls are already in place, e.g. when the shelving, counter or the like is to be added as a renovation, the wooden studs must be located and, when securing the bracket, care must be exercised to insure that the fasteners utilized are securely affixed to the wooden studs. Often, additional brackets may be utilized with additional points of attachment to insure a strong, secure structure that will not collapse if heavily loaded.

SUMMARY OF THE INVENTION

In contrast, the present invention provides a bracket which can be installed or removed in a matter of seconds to a 2×4 wooden stud or other structural support member, even in existing building walls, without requiring the use of any special tools.

Briefly described, the bracket of the present invention has a base in which a pair of openings are formed in spaced relation to one another. A pair of tabs extend respectively in spaced relation outwardly from one side of the base, and a pair of tubular rod housing members extends respectively in spaced relation outwardly from the opposite side of the base in interior correspondence with the openings therein. A bracket member is affixed to the base between the tabs and is movable between an operative supporting position and an inoperative mounting position. A pair of operating rods extends respectively through the openings and through the tubular rod housing members, the tubular rod housing members being sufficiently enlarged interiorly relative to the operating rods to permit movement of the operating rods both longitudinally and laterally within the tubular rod housing members. Each operating rod is connected at one end thereof to the bracket member for actuation of longitudinal movement of the operating rods within the tubular rod housing members toward the bracket member upon movement thereof into its operating supporting position and away from the bracket member upon movement thereof into its inoperative mounting position. An engagement mechanism, preferably including a sharpened barb, is affixed to the opposite end of each operating rod and is exposed at the outwardly projecting end of the associated tubular rod housing member. Each of the barbs is oriented angularly toward the base and toward one another for engagement with a structural support member. A cam arrangement is provided at the projecting outward end of each of the tubular rod housing members for causing the barbs to move laterally inwardly toward one another when the bracket member is moved into its operative supporting position and to move laterally outwardly away from one another when said bracket member is moved into its inoperative mounting position.

Thus, the bracket is mountable on a structural support member with the tubular rod housing members disposed at laterally opposite sides thereof when the bracket member is disposed in its inoperative mounting position, and the bracket is securely engagable on the structural support member by then moving the bracket member to its operative supporting position to cause the barbs to be moved toward one another into engagement with the laterally opposite sides of the structural support member.

In the preferred embodiment of the present invention, the base includes a substantially flat base plate, and the pair of tabs respectively extend from the one side of the base adjacent the openings therein. The bracket member is pivotably affixed to a central portion thereof to the tabs and includes a support arm and a brace arm extending from the central portion in essentially perpendicular relation to one another. An actuating pin is supported by the bracket member at a spacing from the pivot location of the bracket member so that the pin is disposed relatively outwardly away from the base when the bracket member is in its operative supporting position and is disposed relatively inwardly toward the base when the bracket member is in its inoperative mounting position. Each of the operating rods is pivotably connected at the one end thereof opposite the barbed end to the actuating pin.

Other and further features and advantages of the present invention will be apparent from the accompanying drawings and the following description of the preferred embodiment.

BRIEF DESCRIPTION OF THE DRAWINGS

FIG. 4 is a partial plan view of the bracket of FIG. 1 in its operative supporting position.

DESCRIPTION OF THE PREFERRED EMBODIMENT

Figure 1:
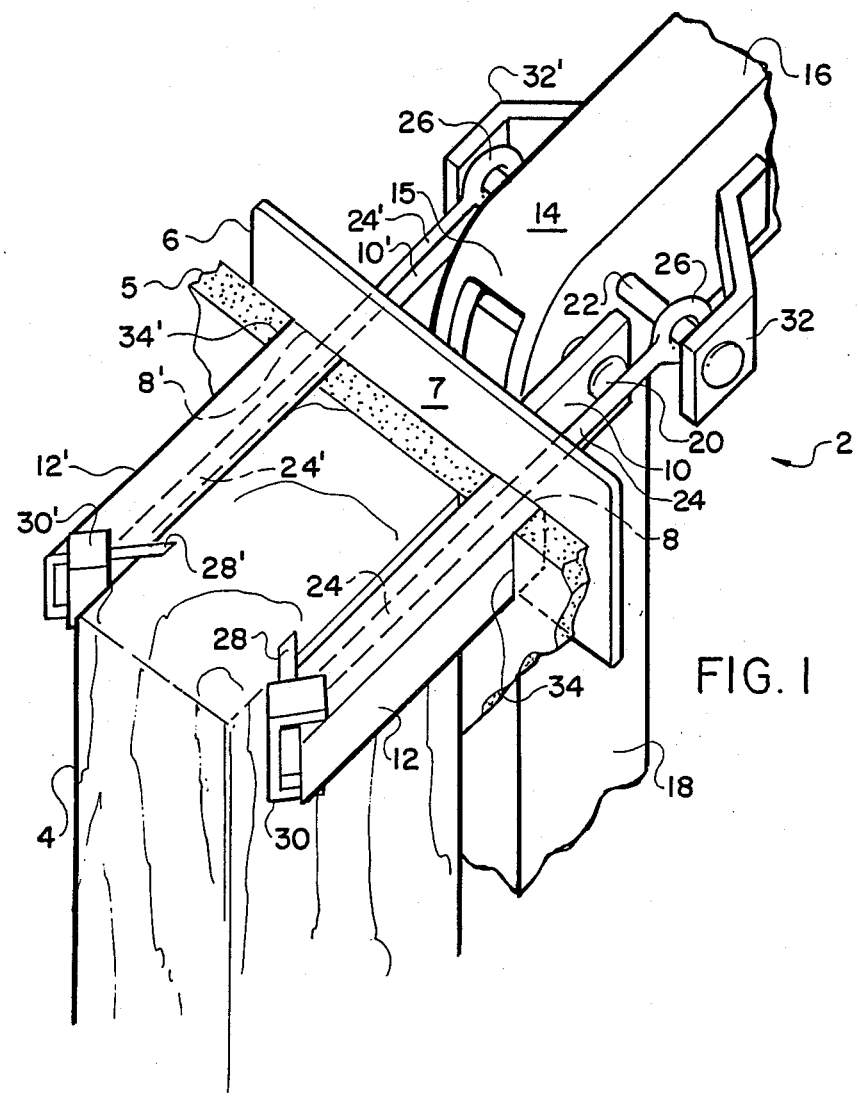
FIG. 1 is a partial perspective view of the bracket of the preferred embodiment of the present invention in its operative supporting position.

Referring now in greater detail to the accompanying drawings and initially to FIG. 1, the self-securing bracket indicated generally at 2 is shown in its operative supporting position in engagement with a structural support member 4 such as a conventional 2×4 building stud which may or may not already have finished wall board 5 affixed thereto. The bracket 2 has a base member 6 which includes a substantially flat plate 7. A pair of openings 8,8' is formed in the base plate 7 in spaced relation to one another and a pair of tabs 10,10' respectively extend in parallel spaced relation perpendicularly outwardly from one side of the base plate 7 between and adjacent the opening 8,8'. The base member 6 also includes a pair of tubular rod housing members 12,12' which extend respectively in parallel spaced relation perpendicularly outwardly from the opposite side of the base plate 7 from the tabs 10,10', with the interior of the tubular housing member 12, 12' corresponding to and communicating with the openings 8,8' in the base plate 7.

Figure 5:
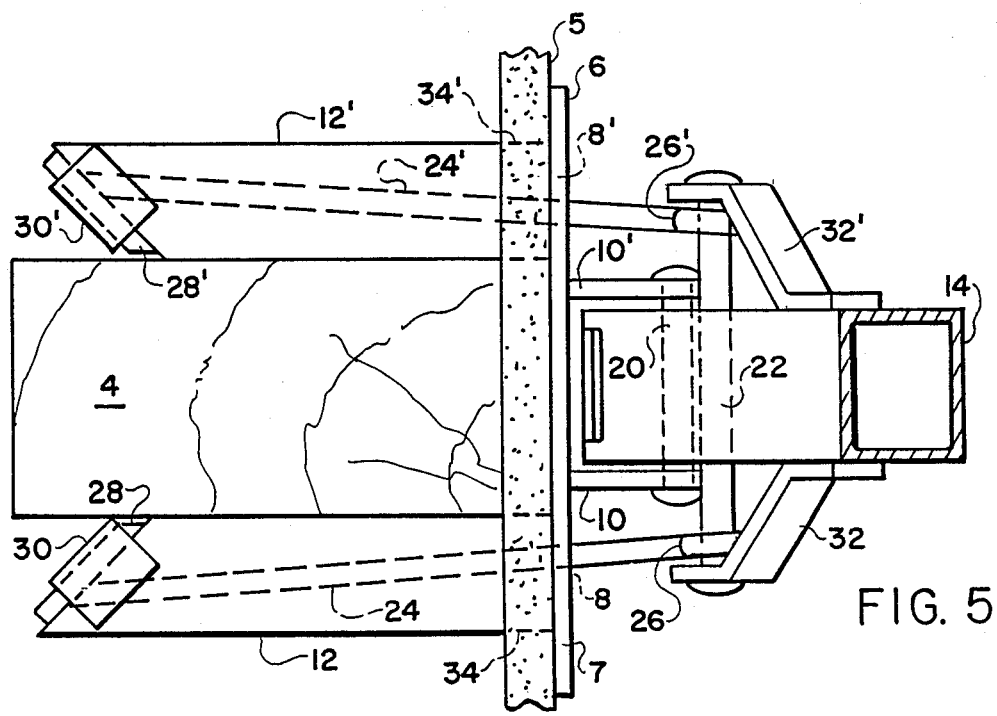
FIG. 5 is a partial plan view of the bracket of FIG. 1 in its inoperative mounting position.

A bracket member 14 is pivotably affixed at a central portion 15 thereof between the tabs 10,10' by a hinge pin 20 which extends between the tabs 10,10' and through the bracket member 14 therebetween as shown in FIGS. 4 and 5. The bracket member 14 is of a generally L-shape with a support arm 16 and a brace arm 18 which extend from the central portion of the bracket member 14 in substantially perpendicular relation to one another. As necessary or desirable, an intermediate stabilizing arm 17 may be provided to extend angularly between the support and brace arms 16,18. As will be described in more detail below, the hinge pin 20 permits the bracket member 14 to be pivoted between an operative supporting position shown in FIGS. 1,2 and 4, wherein the brace arm 18 extends in substantially parallel relation to the base plate 7 and an inoperative mounting position shown in FIGS. 3 and 5, wherein the brace arm 18 is pivoted outwardly from the base plate 7 in angular relation therewith. The support arm 16 has an actuating pin 22 extending therethrough at a spacing outwardly from the central portion of the bracket member 14 to move toward and away from the base plate 7 in accordance with pivotal movement of the bracket member 14 between its inoperative mounting position and its operative supporting position.

Figure 2:
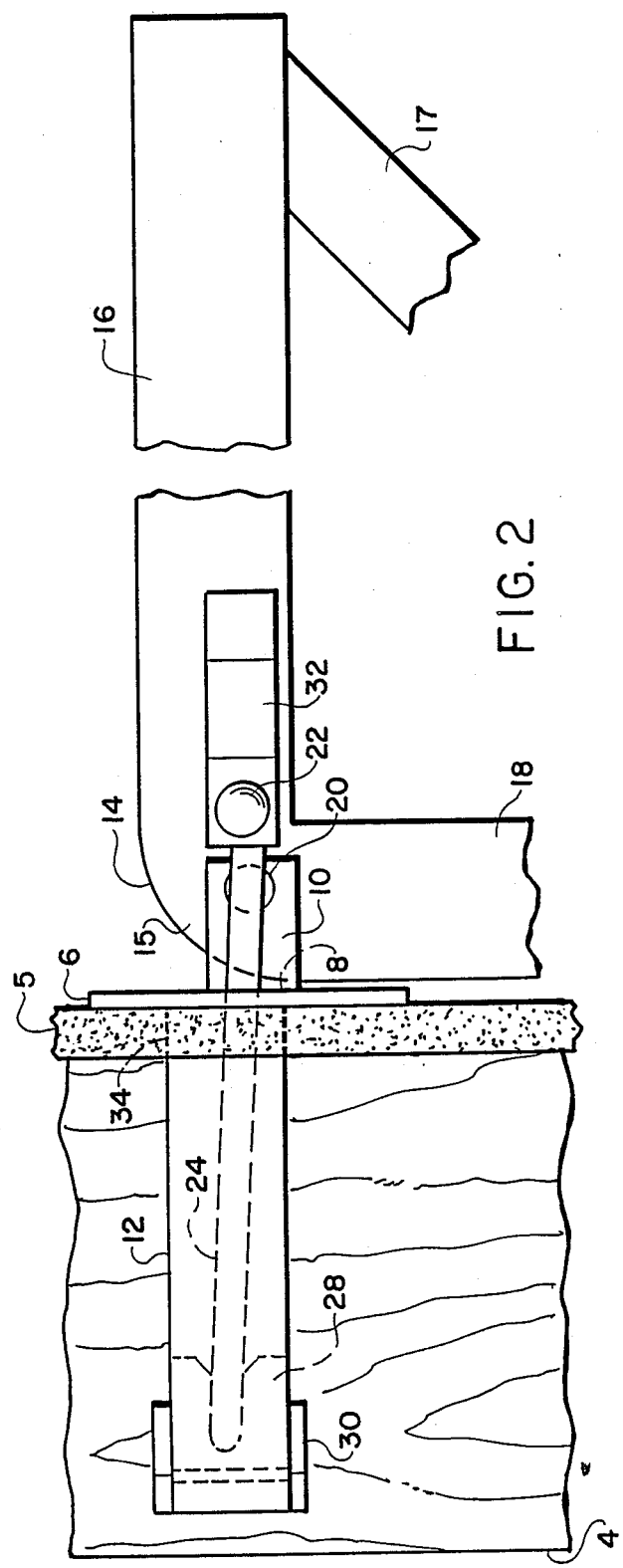
FIG. 2 is a partial vertical side view of the bracket of FIG. 1 in its operative supporting position.

A pair of elongate operating rods 24,24' respectively extend longitudinally through the openings 8,8' in the base plate 7 and through the tubular rod housing members 12,12'. The rod housing members 12,12' are sufficiently enlarged interiorly relative to the operating rods 24,24' to permit movement of the operating rods 24,24' both longitudinally and laterally within the tubular rod housing members 12,12' when the bracket member 14 is moved between its operative and inoperative positions, as more fully described below. Each operating rod 24,24' has an eyelet 26,26' formed at one end thereof through which the actuating pin 22 extends for pivotably connecting the operating rods 24,24' thereto. In this respect, the operating rods 24,24' are adapted to move longitudinally within the rod housing members 12,12' as the bracket member 14 is pivoted between its operative and inoperative positions. When the bracket member 14 is pivoted into its operative supporting position as shown in FIGS. 1, 2 and 4, the actuating pin 22 is caused to move outwardly from the base plate 7 into a disposition essentially in horizontal alignment with the hinge pin 20 which, in turn, causes the operating rods 24,24' to move longitudinally within the tubular rod housing members 12,12' outwardly in relation to the wall 5 and toward the bracket member 14. Conversely, the actuating pin 22 moves relatively inwardly toward the base plate 7 and upwardly in relation to the hinge pin 20 upon pivotal movement of the bracket member 14 into its inoperative mounting position, causing the operating rods 24,24' to move inwardly with respect to the wall 5 within the housing members 12,12' and away from the bracket member 14.

Each of the operating rods 24,24' has a sharpened barb 28,28' affixed to the end opposite the eyelet 26,26'. The barbs 28,28' are exposed at the outwardly projecting end of the associated tubular rod housing member 12,12' with the barbs 28,28' being oriented angularly toward the base member 6 and toward one another. As best seen in FIGS. 1, 4 and 5, the outward ends of the tubular rod housing members 12,12' are formed at an inward angle corresponding to the barbs 28,28' and a cam member 30,30' is mounted to the projecting outward end of each tubular rod housing member 12,12' for constraining the barbs 28,28' to move laterally inwardly toward one another when the bracket member 14 is pivoted into its opeative supporting position as seen in FIG. 4 and to move laterally outwardly away from one another when the bracket member 14 is pivoted into its inoperative position as shown in FIG. 5.

Figure 3:
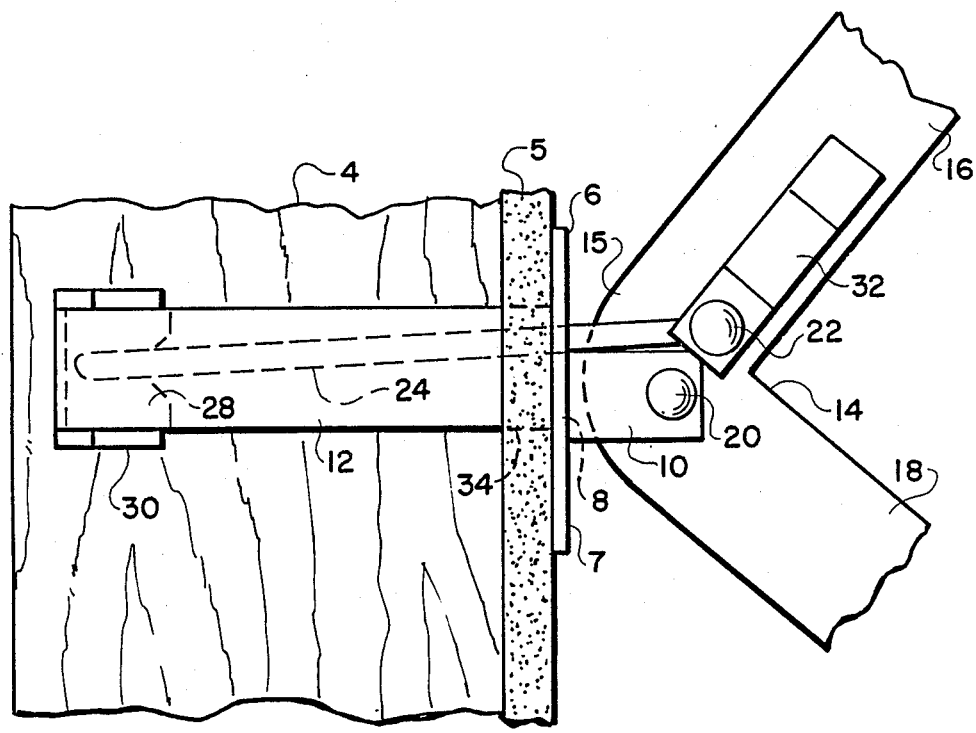
FIG. 3 is a partial vertical side view of the bracket of FIG. 1 in its inoperative mounting position.

Mounting and demounting operation of the bracket 2 onto and from a 2×4 building stud or other structural support member 4 will thus be understood. In existing walls and similar structures already provided with wall board 5 or other structural covering over the support member 4, it is necessary initially to merely cut or otherwise form suitable openings 34,34' in the wall 5 of a size and shape corresponding to the tubular rod housing members 12,12' at opposite sides of the support member 4. With the bracket member 14 pivoted into its inoperative mounting position with the barbs 28,28' laterally outwardly from one another as seen in FIGS. 3 and 5, the bracket is mountable on the structural support member 4 by positioning the tubular rod housing members 12,12' to extend along opposite sides of the structural support member 4 with the base plate 7 abutting the support member 4 or the wall 5 (as the case may be) as shown in FIG. 5. The bracket 2 may then be securely engaged on the structural support member 4 by pivoting the bracket member 14 downwardly into its operative supporting position as shown in FIGS. 1, 2 and 4, with the support arm 16 extending substantially perpendicular to the support member 4 and the wall 5 and the brace arm 18 extending substantially parallel to the structural support member 4 and the wall 5. This pivotal movement causes the operating rods 24,24' to be pulled outwardly and forces and the barbs 28,28' to be moved toward one another into penetrating engagement with the laterally opposite sides of the structural support member 4.

A pair of reinforcing members 32,32' for the actuating pin 22 are provided, each being affixed at one end to an end of the actuating pin 22 and extending therefrom to a point of affixation to the support arm 16 outwardly of the actuating pin 22 from the base plate 7. The reinforcing members 32,32' provide additional support for the actuating pin 22 to prevent the pin 22 from being distorted as the bracket member 14 is pivoted into its operative supporting position and the sharpened barbs 28,28' are forced into engagement with support member 4.

It should therefore follow from the preceding to those persons skilled in the art that the bracket 2 of the present invention may be easily installed and removed in a matter of seconds without any special tools except possibly a drill, saw or other such cutting tool for forming the two openings 34,34' in an existing wall on opposite sides of the structural support member 4 for insertion of the tubular rod housing members 12,12'. When in its operative supporting position with the barbs 28,28' in penetrating engagement with the laterally opposite sides of the structural support member 4, the bracket 2 is securely affixed to the structural support member 4 and is capable of supporting substantial weight. The bracket 2 in this position can be readily utilized as for support for shelving or other cantilevered platforms. Moreover, since the bracket 2 is readily securable and removable, it is highly functional as a temporary support means to support workmen and tools during construction or renovation of a building or similar structures or in other applications where it is desirable to the support to be easily and quickly relocated.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A bracket adapted for self-securement to a structural support member or the like, comprising:
    a base having a pair of openings formed therein in spaced relation to one another;
    a pair of tabs respectively extending in spaced relation outwardly from one side of said base;
    a pair of tubular rod housing members respectively extending in spaced relation outwardly from the opposite side of said base in interior correspondence with said openings;
    a bracket member affixed to said base between said tabs for movement between an operative supporting position and an inoperative mounting position;
    a pair of operating rods respectively extending longitudinally through said openings and said tubular rod housing members, said tubular rod housing members being sufficiently enlarged interiorly relative to said operating rods to permit movement of said operating rods both longitudinally and laterally within said tubular rod housing members, each operating rod being connected at one end thereof to said bracket member for actuation of longitudinal movement of said operating rods within said tubular rod housing members toward said bracket member upon movement thereof into its operating support position and away from said bracket member upon movement thereof into its inoperative mounting position;
    engagement means affixed to the opposite end of each said operating rod and exposed at the outwardly projecting end of the associated tubular rod housing member for engagement with a structural support member;
    cam means at the projecting outward end of each said tubular rod housing member for causing said engagement means to move laterally inwardly toward one another when said bracket member is moved into its operative supporting position and to move laterally outwardly away from one another when said bracket member is moved into its inoperative mounting position;
    said bracket being mountable on a structural support member with said tubular rod housing members disposed at laterally opposite sides thereof when said bracket member is disposed in its inoperative mounting position and said bracket being securely engagable on the structural support member by then moving said bracket member to its operative supporting position to cause said engagemetn means to be moved toward one another into engagement with the laterally opposite sides of the structural support member.

2. A bracket according to claim 1 and characterized further in that said base includes a substantially flat base plate.

3. A bracket according to claim 1 and characterized further in that said pair of tabs respectively extend from said one side of said base adjacent said openings.

4. A bracket according to claim 1 and characterized further in that said bracket member is pivotably affixed at a central portion thereof between said tabs and includes a support arm and a brace arm extending from said central portion in essentially perpendicular relation to one another.

5. A bracket according to claim 1 and characterized further in that said bracket member is pivotably affixed to said tabs, an actuating pin being supported by said bracket member at a spacing from the pivot location to be disposed relatively outwardly away from said base when said bracket member is in its operative supporting position and to be disposed relatively inwardly toward said base when said bracket member is in its inoperative mounting position.

6. A bracket according to claim 5 and characterized further in that each of said operating rods is pivotably connected at said one end thereof to said actuating pin.

7. A bracket according to claim 1 and characterized further in that said engagement means comprises a sharpened barb affixed to said opposite ends of each said operating rod, each said barb being exposed at the outwardly projecting end of the associated tubular rod housing member with said barbs being oriented angularly toward said base and toward one another.

8. A bracket adapted for self-securement to a structural support member or the like, comprising:
    a base member having a substantially flat base plate, a pair of openings formed in said base plate in spaced relation to one another, a pair of tabs respectively extending in spaced relation outwardly from one side of said base plate adjacent said openings, a pair of tubular rod housing members respectively extending in spaced relation outwardly from the opposite side of said base plate in interior correspondence with said openings;
    a bracket member pivotably affixed at a central portion thereof between said tabs and having a support arm and a brace arm extending from said central portion in substantially perpendicular relation to one another;
    an actuating pin supported by one of said arms at a spacing from said central portion;
    said bracket member being pivotable between an operative supporting position wherein said actuating pin is disposed relatively outwardly away from said base plate and an inoperative mounting position wherein said actuating pin is disposed relatively inwardly toward said base plate;

a pair of operating rods respectively extending longitudinally through said openings and said tubular rod housing members of said base member, said tubular rod housing members being sufficiently enlarged interiorly relative to said operating rods to permit movement of said operating rods both longitudinally and laterally within said tubular rod housing members, each operating rod being pivotably connected at one end thereof to said actuating pin for actuation of longitudinal movement of said operating rods within said tubular rod housing members toward said bracket member upon pivotal movement thereof into its operative supporting position and away from said bracket member upon pivotal movement thereof into its inoperative mounting position;

a sharpened barb affixed to the opposite end of each said operating rod and exposed at the outwardly projecting end of the associated with tubular rod housing member with said barbs being oriented angularly toward said base plate and toward one another;

a cam member mounted to the projecting outward end of each said tubular rod housing member for causing said barbs to move laterally inwardly toward one another when said bracket member is pivoted into its operative supporting position and to move laterally outwardly away from one another when said bracket member is pivoted into its inoperative mounting position;

said bracket being mountable on a structural support member with said base plate in abutment therewith and with said tubular rod housing members disposed at laterally opposite sides thereof when said bracket member is disposed in its inoperative mounting position and said bracket being securely engagable on the structural support member by then pivoting said bracket member to its operative supporting position to cause said barbs to be moved toward one another into engagement with the laterally opposite sides of the structural support member.

* * * * *

UNITED STATES PATENT OFFICE
CERTIFICATE OF CORRECTION

Patent No. 4,771,972                    Dated September 20, 1988

Inventor(s)  Franklin J. Shaw

It is certified that error appears in the above-identified patent and that said Letters Patent are hereby corrected as shown below:

Column 4, line 14  delete "opeative" and insert therefor — operative —.
Column 4, line 20  delete "w ill" and insert — will —.
Column 4, line 44 delete "and" second occurrence
Column 6, line 14  delete "engagemetn" and insert — engagement —
Column 7, line 23, delete "with" and insert — said —

Signed and Sealed this

Fourteenth Day of November, 1989

*Attest:*

JEFFREY M. SAMUELS

*Attesting Officer*            *Acting Commissioner of Patents and Trademarks*